April 17, 1951     A. L. CHRISTY     2,549,169

BLENDING APPARATUS

Filed Nov. 7, 1947

INVENTOR.
ANKER L. CHRISTY
BY Edward H. Lang
ATTORNEY

Patented Apr. 17, 1951

2,549,169

UNITED STATES PATENT OFFICE 2,549,169

BLENDING APPARATUS

Anker L. Christy, Kenilworth, Ill., assignor to The Pure Oil Company, Chicago, Ill., a corporation of Ohio Application November 7, 1947, Serial No. 784,586

5 Claims. (Cl. 259—95)

This invention relates to an apparatus and a method for blending liquids such as lubricating oils and, in particular, compositions comprising mineral oil lubricating components containing one or more additives in small but effective amounts.

It is axiomatic that lubricating liquids are tailored to fit the function for which they are intended. Accordingly, every lubricant is a complex system containing in addition to the base oil, one or more ingredients to balance its anti-corrosion, extreme pressure, anti-oxidation, and detergent characteristics. In the preparation of such balanced lubricating compositions, the processing steps always include the blending of the base lubricant with the balancing ingredients.

It is, accordingly, an object of this invention to provide a method and an apparatus for performing efficient and rapid blending of liquids with each other and one or more balancing ingredients.

It is another object of the invention to provide an apparatus in which metering, mixing, and heating can be conducted with a maximum of efficiency.

It is a further object of the invention to provide an apparatus wherein the blending can be conducted under reduced or elevated pressure and elevated temperature to bring about a certain amount of distillation and drying of the fluid being blended.

Other objects and advantages of the invention will in part be obvious and in part appear hereinafter.

The invention, accordingly, consists of a blending kettle having the features of construction, combination of elements and arrangement of parts for blending of liquids such as lubricants and includes an elongated vessel served by a metering feed apparatus for introducing fluid thereto and containing circulating apparatus, and heating-contacting apparatus for bringing about mixing and heating of the fluid.

More specifically, the apparatus comprises a kettle having a conical bottom, a centrally disposed conduit communicating with a pump in the bottom of the tank to receive liquid being blended and direct it through an array of orifices against the face of a deflecting plate in the upper portion of the tank, from which the liquid flows onto the face of a second deflecting plate and thence back to the body of liquid in the tank.

To accomplish efficient heating and blending of the ingredients comprising the composition, the deflecting plates can be made hollow to provide for the introduction of steam or other heating mediums.

For a more precise understanding of the nature and scope of the invention, reference should be had to the accompanying drawings which show a preferred embodiment of the invention in which.

Figures 1, 2, 3, 4:
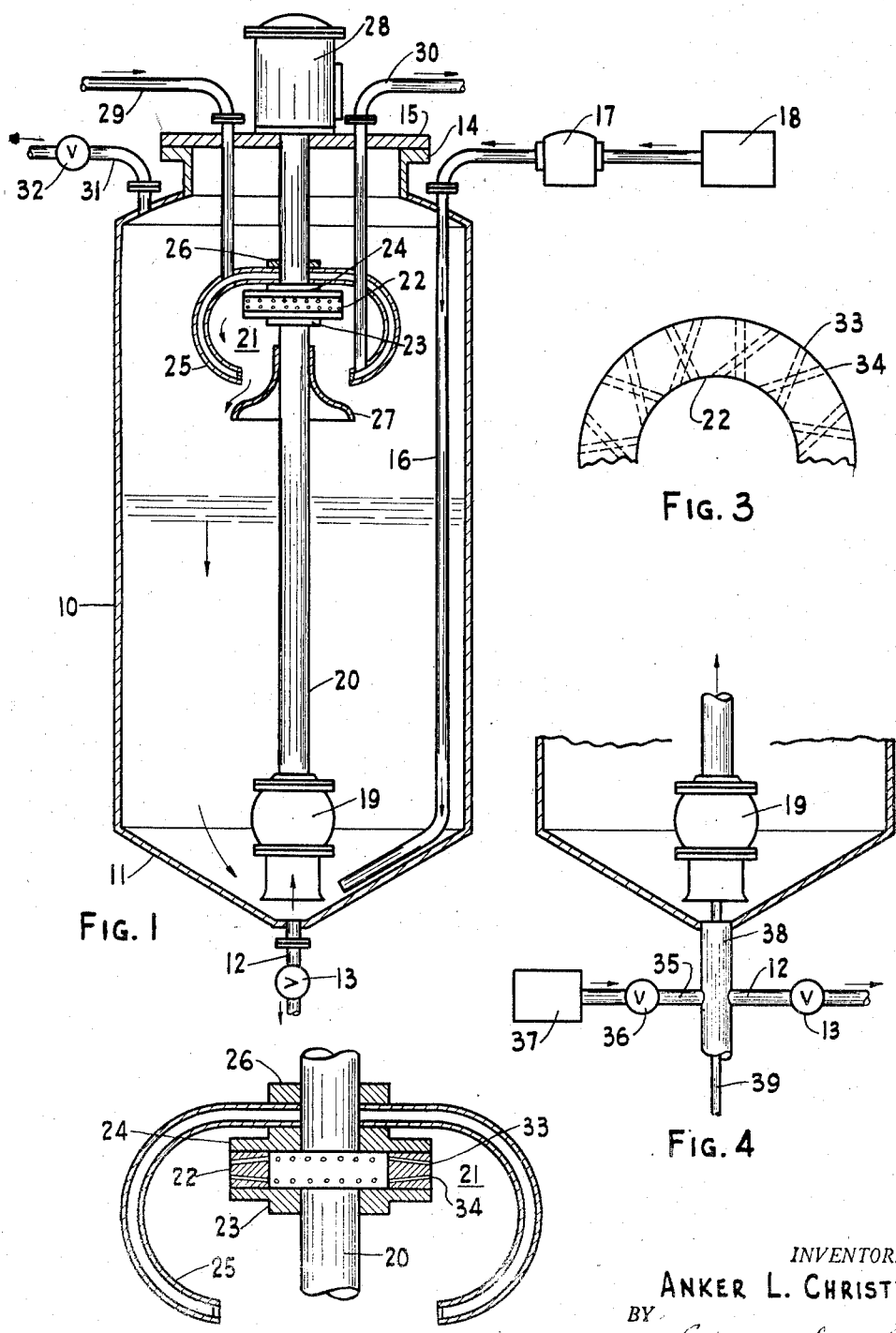
Figure 1 is a longitudinal section showing the relationship of the several parts of the apparatus in diagrammatic form.
Figure 2 is a sectional view of a distributing ring for ejecting liquid being blended.
Figure 3 is a plan view of a portion of the distributing ring to illustrate the arrangement of one form of orifice on the device.
Figure 4 is a partial section of the apparatus to illustrate an alternative arrangement of feed conduit and pump drive.

Referring to Figure 1, 10 represents the body of a large, elongated kettle having a conical bottom 11 equipped with a conduit outlet 12, controlled by valve 13. The kettle has its top closed by flange 14 and cover plate 15.

For the purpose of introducing liquids into the bottom of the kettle, there is provided an inlet conduit 16 equipped with metering pump 17. The point for the introduction of the fluids and components to be blended is shown in block form as 18 inasmuch as these specific devices do not constitute a part of the combination constituting the invention.

Disposed near the bottom of the tank is a sump pump 19 with its outlet connected to central conduit 20 in the tank. Conduit 20 terminates in a distributing head 21 which is made up of ring 22 held in place by flanges 23 and 24. The distributing head is shown in section in Figure 2 and described in detail below. Disposed over and around said distributing head in the upper portion of said kettle is an inverted bowl-shaped deflecting surface 25 which is held conveniently in fixed spaced relationship with the head on the centrally disposed conduit by flange 26. Disposed below the deflecting plate 25 and also carried by centrally disposed conduit 20 is an inverted saucer-shaped deflecting plate 27.

On the top of the tank and exterior thereto is motor 28 having a drive shaft which passes through the top of the tank and down through the centrally disposed conduit to provide motive power for the pump in the bottom of the tank. At any convenient point in the upper portion of the tank, a steam line such as 29 can be introduced to bring steam or heating medium to one or both of the deflecting plates, for example 25. Steam condensate escapes via line 30. A line 31 controlled by valve 32 serves to provide connection to a pump for evacuating the tank.

In Figure 2 there is shown an enlarged section of the distributing head employed for spreading liquid and ingredients to be blended over the deflecting plates. The distributing head is made up essentially of a doughnut-shaped ring 22, which may be rectangular, circular or elliptical in cross section, having orifices 33, 34 arranged circumferentially on the ring. It will be noted that orifices in the upper course are directed at a different angle from those in the lower course. The orifices may be individual cuts or an arrangement of a number of separate holes, but so directed that liquid streams ejected from the upper and lower courses will meet where they impinge upon deflecting plate 25. The object of providing the orifices set at angles is to cause confluence of the liquid streams at the surface of the deflecting plate, thereby subjecting them to shearing stress in the ejection and mixing when they spread out into a film on the surface.

Figure 3 illustrates the manner in which the orifices are preferably oriented away from radii of the ring.

An alternative form of the apparatus is shown in Figure 4 embodying a modification of the bottom of the tank. The outlet conduit and valve 12 and 13 as described in connection with Figure 1 are shown. Conduit 35 and valve 36 represent an inlet to which the metering pump 37 can be connected to introduce liquid directly into the bottom of the tank through conduit 12. Power is supplied to the circulating pump 19 through the bottom of the tank by means of drive shaft 39 which passes into the bottom of the tank through conduit 38 to the pump 19. A suitable packing gland will have to be provided in conduit 38 below the point of connection with conduits 12 and 35 to prevent leakage of liquid from tank 10.

From the above description of the structure of the tank and arrangement of the combination of parts, the operation thereof can be readily understood. For example, in the preparation of a lubricating oil consisting of two or more mineral oils, an extreme pressure additive, a corrosion inhibitor and a detergent, the several ingredients would be measured out and mixed and introduced into the apparatus through metering pump 17 from which the flow is in the direction of the arrows to the bottom of the tank. It is also possible to introduce the ingredients of the oil into the apparatus successively. The pump 19 lifts the materials, drives them through the annular space between conduit 22 and the centrally disposed drive shaft into the distributing head from which the liquid is thrown at high speed against the inside surface of deflecting plate 25. The liquid is subjected to shear in its passage from the distributing head to the deflecting plate where it is spread into a film, heated, and passed onto the second deflecting plate over which it flows in a thin film to undergo further mixing. From the second deflecting plate, the liquid is returned to the body of liquid in the tank where in due course it is pumped through the circuit a second and more times as may be required. By maintaining the liquid level in the tank at a point below the level of the second deflecting plate, it is possible to circulate liquids being blended rapidly through the tank and to heat them rapidly, thereby to avoid danger of discoloration and darkening, which follow from extended heating in conventional steam heated kettles. Where the oil or any of the ingredients being used in blending contain water in small amount, or low boiling constituents, it is easily possible to remove such matter by subjecting the fluid in the tank to a vacuum during the heating and mixing thereof.

In an operation in which two stocks are used to prepare a blend of a given viscosity, it will be found that circulation of the fluids for a period of time sufficient to take the entire volume through the circuit about ten times will insure complete mixing. The time consumed in the preparation of the batch will depend upon the capacity of the sump pump and the total volume of liquid.

It is also apparent that by introducing liquids at the top of the tank to spread them over the first deflecting plate and raising the pump toward the middle of the tank, the apparatus can be made to operate as a continuous blender.

What is claimed is:

1. A blending apparatus comprising, a vessel, conduit means communicating with the bottom thereof for introducing materials to be blended into said vessel to form a body of material therein, a centrally disposed conduit and pump near the bottom of said vessel for taking liquid from the lower portion thereof, a distributing head communicating with said centrally disposed conduit and maintained in fixed spaced relation therewith and having arranged thereon a plurality of orifices for liquid ejection in the space above the body of liquid in the vessel, concave deflecting means surrounding said distributing head for intercepting liquid discharged therefrom, and deflecting means under said concave deflecting means for intercepting the liquid drained from said concave surface, and returning it to the body of liquid in said vessel.

2. An apparatus in accordance with claim 1 in which the said distributing head has nozzles arranged therein to direct streams of liquid to points of confluence corresponding substantially to the concave surface of the said deflecting plate.

3. An apparatus in accordance with claim 1 in which said concave deflecting means is a hollow member communicating with a source of heating fluid.

4. An apparatus in accordance with claim 2 in which the concave deflecting means is a hollow member communicating with a source of heating fluid.

5. An apparatus in accordance with claim 2 in which the deflecting members are heating and deflecting members.

ANKER L. CHRISTY.

REFERENCES CITED

The following references are of record in the file of this patent:

UNITED STATES PATENTS

| Number | Name | Date |
|---|---|---|
| 134,706 | Schultze | Jan. 7, 1873 |
| 923,571 | Paterson | June 1, 1909 |
| 1,741,176 | Wilder | Dec. 31, 1929 |
| 1,926,446 | Klosson | Sept. 12, 1933 |
| 2,250,314 | Rocke | July 22, 1941 |
| 2,421,191 | Durbin | May 27, 1947 |

FOREIGN PATENTS

| Number | Country | Date |
|---|---|---|
| 578,758 | Germany | June 16, 1933 |